3,806,474
HYDROPHILIC POLYESTER URETHANE FOAM
Edgar A. Blair, Princeton, N.J., assignor to Princeton Polymer Sponge Corporation, Plainsboro, N.J.
No Drawing. Continuation-in-part of abandoned application Ser. No. 92,250, Nov. 23, 1970. This application Dec. 27, 1972, Ser. No. 318,730
Int. Cl. C08g 22/48
U.S. Cl. 260—2.5 AG          5 Claims

ABSTRACT OF THE DISCLOSURE

A sponge is made of a polyester polyurethane having a density of 3 to 4.5 lb./cu. ft., a volume swell in water of 20–50% and a cell size of 100 to 5 cells per linear inch. The sponge is prepared using three different surfactants and has an open cell structure.

---

This application is a continuation-in-part of application Ser. No. 92,250 filed Nov. 23, 1970 and now abandoned.

The present invention relates to a hydrophilic polyurethane foam in sponge form.

There are many polyurethane foams on the market for use as sponges. However, these sponges do not have the water holding or wiping properties of cellulose sponges. Also they are not hydrophilic.

It is an object of the present invention to provide an improved polyurethane sponge.

Another object is to prepare a polyurethane sponge of improved water holding power.

A further object is to prepare a non-shrinking polyurethane sponge.

An additional object is to prepare a polyurethane sponge having improved wiping properties.

Yet another object is to prepare a polyurethane sponge which is soft when dry.

It has now been found that these and other objects of the invention which will be revealed hereinafter can be accomplished by preparing a polyurethane sponge of specific composition which has the water holding, wiping and other performance properties of a cellulose sponge, but also is soft when dry.

All of the functions of the materials present in the composition are essential. Hence all of the materials must be present or they must be replaced by equivalent materials. The physical properties of the sponge must also be as described, or the performance will not be suitable.

The general description of the foam or sponge is that it must be the reaction product of a prepolymer of toluene diisocyanate with polyethylene oxide and a linear difunctional diethylene glycol adipate polyester. The polyurethane foam should have a density of 3.0 to 4.5 lb./cu. ft., preferably being at least 3.5 lb./cu. ft., it should have a volume swell in water of 20–50% preferably at least 35%, have a mixture of cell sizes ranging from very fine to coarse, i.e. 100 cells per linear inch to 5 cells per linear inch and it must include three specific types of surfactant, preferably in a total amount of 0.2 to 30% based on the polyurethane to improve the initial wetting of the foam or sponge. The cells are open cells.

The starting polyester preferably has a molecular weight of 1000–3500, most preferably 2000. The polyester as stated in polymerized diethylene glycol adipate.

It is critical that the toluene diisocyanate employed be the mixture of isomers containing 65% 2,4 isomer and 35% 2,6 isomer since when the 80% 2,4 isomer and 20% 2,6 isomer, such as that used in Elkins Pat. 2,965,-584 under the trade name Hylene TM, is employed in the formulations of the invention the foam obtained is a non-porous, closed cell foam. Such a non-porous foam contains carbon dioxide in the bubbles which gradually leak out and the foam shrinks. In contrasts in the foams of the invention the bubbles break but are strong enough to keep the structure (i.e. the foam is permanent) and no shrinkage.

The toluene diisocyanate is reacted with a polyalkylene glycol of molecular weight 500 to 2000 to form a quasi prepolymer. Preferably polyethylene glycol is used (e.g. prepared from ethylene oxide) but there can also be used polypropylene glycol in the same molecular weight range. The toluene diisocyanate is used in an amount sufficient to react with all of the polyalkylene glycol and to have a slight excess of free isocyanate. The isocyanate content of the quasi prepolymer is 3 to 15%.

The quasi prepolymer is then reacted with the polyester and free water to form the open cell foam.

As a foam stabilizer there is preferably used Span 60 which is sorbitan monostearate but there can also be used sorbitan monopalmitate (Span 40) sorbitan monolaurate (Span 20), or sorbitan moooleate (Span 80). These surfactants are sorbitan monoesters of fatty acids having 12 to 18 carbon atoms.

To obtain the desired large bubble formation there is employed Tween 80 which is polyoxyethylene sorbitan monooleate (20 ethylene oxide units) but there can also be employed polyoxyethylene sorbitan monolaurate (Tween 20) polyoxyethylene sorbitan monopalmitate (Tween 40) or polyoxyethylene sorbitan monostearate (Tween 60), in each case there being 20 ethylene oxide units per molecule. These surfactants are polyoxyethylene sorbitan monoesters of fatty acids having 12 to 18 carbon atoms and have 20 ethylene oxide units per molecule.

To facilitate initial wetting there is used a surfactant which does not react with isocyanates and which does not affect foam stability. For this purpose there is employed Igepon AC–78 which is the coconut oil acids ester of sodium isethionate.

A preferred range of proportions is 65 to 180 parts of the quasi prepolymer of the polyalkylene glycol and toluene diisocyanate, 20 to 60 parts of diethylene glycol adipate, 0.5 to 3 parts of the Span 20 or similar material, 0.5 to 3 parts of Tween 80 or similar material and 2 to 20 parts of Igepon AC–78.

To carry out the foaming reaction there can be used any of the conventional basic catalysts employed in polyurethane foam technology, i.e. N-methyl morpholine, N-ethyl morpholine, trimethyl amine, triethyl amine, tributyl amine and other trialkyl amines, 3-diethylaminopropionamide, triethylamine citrate, triethylene diamine, diethylethanolamine, N,N,N',N'-tetrabis (hydroxypropyl) ethylene diamine, N,N' - dimethylpiperazine, N,N - dimethylhexahydroaniline, tribenzyl amine and sodium phenolate. In the above preferred formulation the amine is used in an amount of 0.1 to 4.0 part, but this can be varied.

Likewise tin compounds can be included such as stannous octoate, stannous oleate, dibutyltin dilaurate, dibutyltin diacetate, di-2-ethylhexyltin oxide, octylstannoic acid, dibutyltin diethoxide, tributyltin monolaurate, dioctyltin diacetate, dibutyltin maleate, trimethyltin hydroxide, trimethyltin chloride, as well as other tin compounds set forth in Hostettler French Pat. 1,212,252. The amount of tin compound used is not critical and can be varied as is conventional in the art. In the preferred formulation it is 0.01 to 1.0 part. Water is preferably used as the foaming agent and is employed in amounts conventional in the art, e.g., 0.5 to 5.0 parts per 100 parts of polyurethane forming materials.

Unless otherwise indicated all parts and percentages are by weight.

A typical preferred formulation range is the reaction product of 50–150 parts of polyethylene oxide of 500–2000 molecular weight with 15–30 parts of toluene diisocyanate, 20–60 parts of difunctional diethylene glycol adipate of molecular weight 1000–3500, 0.1–1.0 part of DABCO (triethylene diamine), 0.15–3 parts of N-methyl morpholine, 0.01–1.0 part of a stannous octoate, 0.5–3 parts of Span 20, 0.5–3 parts of Tween 80 and 2–20 parts of Igepon AC–78.

A specific example of preparing a preferred sponge having the above described properties is set forth below:

EXAMPLE 1

The quasi prepolymer from 60 parts of polyethylene oxide having a molecular weight of 1000 with 25 parts of toluene diisocyanate (65% 2,4 isomer, 2,6 isomer), 40 parts of diethylene glycol adipate molecular weight 2000, 1.8 parts of water, 0.5 parts of DABCO, 1.5 parts of methyl morpholine, 0.1 part of stannous octoate, 1 part of Span 60, 1 part of Tween 80 and 10 parts of Igepon AC–78 were mixed to form a foam in the shape of a sponge having a density of 3.5 lb./cu.ft., a volume swell in water between 20–50% and mixed cell sizes ranging from 100 to 5 cells per linear inch. The sponge had the water holding and wiping properties of a cellulose sponge and was soft when dry. The sponge when dry did not shrink upon standing and the cells were of the open type, i.e., when the foam was foamed the bubbles broke but were strong enough to retain the structure of the sponge.

EXAMPLE 2

45.6 g. of a prepolymer made by reaction of 241 grams of Carbowax 1540 (a polyethylene oxide with a molecular weight of 1000, and 125 g. of Hylene TM 65, (a mixed toluene diisocyanate having 65% of the 2.4 isomer, and 35% of the 2.6 isomer).

20.0 g. polyester F–15–22, a diethylene glycol adipate polyester having a hydroxyl number of 55,
0.7 g. $H_2O$
2.0 g. methyl morpholine
0.2 g. stannous octoate
0.2 g. Span 60
0.5 g. Tween 80
2.5 g. Igepon AC–78, a coconut acid ester of sodium isethionate, made by GAF.

The foam prepared by this formulation had a density of 4.7 lbs. per cubic foot and swelled 108% by volume when immersed in water. It had both large and small cells, and formed profuse amounts of lather when squeezed in water. The cells in the foam were of the open cell type.

If the Igepon AC–78 surfactant is replaced with a surfactant such as Triton X–100, the foam collapses during formation. The Igepon AC–78 has no effect in the foam formation, but is released when the foam is wet with water. The Tween 80 is the foam stabilizer, which allows the foam to form. If it is omitted, the foam collapses during formation. The Span 60 creates the large cells. Their size and number depends on the amount added.

The formulation is a partial or quasi prepolymer formulation. If the same composition is run as a one shot foam, the foam is closed cell, shrinks and is unuseable. If the TM–65 is replaced with 80:20 TDI, the foam is closed cell even if a quasi prepolymer formulation is used.

EXAMPLE 3

47 g. prepolymer (made from 60 parts of Carbowax 1540 and 34 parts of TM 65)
0.9 g. $H_2O$
2.0 g. methyl morpholine
0.2 g. stannous octoate
0.5 g. Tween 80
0.1 g. Span 60
2.5 g. Igepon AC–78

This formulation had a density of 3.1 lb./per cubic foot, and swelled 45% by volume in water. The cells of the foam were open cells.

What is claimed is:

1. A linear polyester based polyurethane sponge characterized by having the water holding and wiping properties of a cellulose sponge and also being soft and non-shrinking when dry, said sponge having a density of 3.0 to 4.5 lb./cu.ft., a volume swell in water of 20 to 50% and mixed open cells having cell sizes ranging from 100 to 5 cells per linear inch and having dispersed through the sponge 3 surfactants, said surfactants being (a) a sorbitan monoester of a fatty acid having 12 to 18 carbon atoms, (b) a polyoxyethylene sorbitan monoester of a fatty acid having 12 to 18 carbon atoms and 20 ethylene oxide units per molecule and (c) the coconut oil acids ester of sodium isethionate, said sponge having been prepared by reacting the diethylene glycol adipate polyester with the quasi prepolymer of polyalkylene glycol and excess toluene diisocyanate in the presence of said surfactants and water, the alkylene units of said polyalkylene glycol containing 2 to 3 carbon atoms and the toluene diisocyanate containing 65% of the 2,4 isomer and 35% of the 2,6 isomer.

2. A sponge according to claim 1 wherein the polyester has a molecular weight of 1000 to 3500 and the polyalkylene glycol has a molecular weight of 500 to 2000.

3. A sponge according to claim 2 wherein (a) is sorbitan monostearate, (b) polyoxyethylene sorbitan monooleate and the polyalkylene glycol is polyethylene glycol.

4. A sponge according to claim 3 wherein the polyurethane is made from 65 to 180 parts of the quasi prepolymer, 20 to 60 parts of the diethylene glycol adipate polyester and there are present in the sponge 0.5 to 3 parts of (a), 0.5 to 3 parts of (b) and 2 to 20 parts of (c).

5. A process of preparing the sponge of claim 1 comprising reacting a quasi prepolymer of the polyalkylene glycol and toluene diisocyanate with said polyester in the presence of water and surfactants (a), (b), and (c).

References Cited
UNITED STATES PATENTS

| | | | |
|---|---|---|---|
| 2,965,584 | 12/1960 | Elkin | 260—2.5 AD |
| 3,079,350 | 2/1963 | Bernstein | 260—2.5 AN |
| 3,002,937 | 10/1961 | Parker | 260—2.5 AG |
| 2,981,700 | 4/1961 | Parker | 260—2.5 AG |
| 2,950,262 | 8/1960 | Bush | 260—2.5 AG |

DONALD E. CZAJA, Primary Examiner

C. W. IVY, Assistant Examiner

U.S. Cl. X.R.

260—2.5 AD, 2.5 AN